(12) United States Patent
Phelan et al.

(10) Patent No.: US 7,001,565 B2
(45) Date of Patent: Feb. 21, 2006

(54) SEALS

(75) Inventors: Paul Phelan, Manchester (GB); Nicholas Derek Quarmby, Manchester (GB)

(73) Assignee: John Crane UK LImited, Slough (GB)

( * ) Notice: Subject to any disclaimer, the term of this patent is extended or adjusted under 35 U.S.C. 154(b) by 63 days.

(21) Appl. No.: 10/463,490

(22) Filed: Jun. 17, 2003

(65) Prior Publication Data
US 2003/0234496 A1 Dec. 25, 2003

(30) Foreign Application Priority Data
Jun. 24, 2002 (GB) .................................. 0214515

(51) Int. Cl.
*B29C 49/20* (2006.01)

(52) U.S. Cl. .......................... 264/516; 29/450; 29/505; 29/515

(58) Field of Classification Search ................ 264/516; 29/450, 446, 505, 515
See application file for complete search history.

(56) References Cited

U.S. PATENT DOCUMENTS

| 3,588,979 | A | * | 6/1971 | Miller | 29/898.059 |
| 3,694,894 | A | * | 10/1972 | Jelinek et al. | 29/451 |
| 3,824,660 | A | * | 7/1974 | Lowe | 29/898.054 |
| 4,209,884 | A | * | 7/1980 | Atkinson | 29/890.122 |
| 4,314,704 | A | * | 2/1982 | Wichall | |
| 2003/0024095 | A1 | * | 2/2003 | Spielmannleitner | 29/421.1 |

FOREIGN PATENT DOCUMENTS

| DE | 3428744 A | * | 2/1985 |
| EP | 0404358 A2 | * | 12/1990 |
| GB | 2296052 | * | 6/1996 |

* cited by examiner

*Primary Examiner*—Suzanne E. McDowell
(74) *Attorney, Agent, or Firm*—Davis & Bujold, P.L.L.C.

(57) ABSTRACT

A composite seal face ring has an inner ring (60) made of material with good tribological properties, the inner ring (60) being pre-compressed by an outer ring (64) with a high tensile strength and a thermal coefficient of expansion substantially equal to that of the inner ring (60). The seal face ring is assembled by compressing the inner ring (60) and/or expanding the outer ring (64) by fluid under pressure, before inserting the inner ring (60) into the outer ring (64).

2 Claims, 3 Drawing Sheets

SEALS

FIELD OF THE INVENTION

The present invention relates to seals.

Normally, mechanical face seals are arranged such that the external diameter of the seal face rings are exposed to a fluid so that the pressure of the fluid will apply a compressive load to the seal ring. Increasing health and safety requirements demand that the seals are also capable of withstanding high internal pressures. Materials currently used for seal face rings which possess good tribological properties, for example carbon/graphite composites, are weak in tension and consequently are not suitable for high internal pressurisation. Typical carbon/graphite composites have tensile strengths of 25 to 50 Mpa and silicon carbide/graphite composite materials have tensile strengths of 60 to 150 Mpa.

Hitherto, this problem has been addressed by the use of materials with higher tensile strengths. This however has been at the expense of the tribological properties resulting in poor wear and seal life.

BACKGROUND OF THE INVENTION

An alternative solution has been to provide a shrouded carbon/graphite seal face ring, with vent holes, to equalise pressure across the seal ring, for example as disclosed in GB2,296,052. This solution however has the disadvantage that it increases the size of the seal significantly.

A further alternative solution has been to shrink fit a metal shroud to the outside diameter of the seal face ring. Because of the high differential thermal expansion between the components, the amount of pre-compression induced on the seal face reduces significantly as the temperature increases, thus limiting the internal pressure capability. Furthermore, the pre-compression induces out of roundness of the seal face ring, causing a wavy distortion to the mating surface. This waviness becomes apparent as the temperature of the ring is changed from that at which the seal face has been lapped.

SUMMARY OF THE INVENTION

In accordance with the present invention, it is proposed to provide a composite seal face ring comprising an inner ring made of material with good tribological properties, the inner ring being pre-compressed by an outer ring with a high tensile strength and a thermal coefficient of expansion substantially equal to that of the inner ring.

Preferably, both the inner and outer rings have a coefficient of thermal expansion of less than $10 \times 10^{-6}/° K$. The outer ring will preferably have a tensile strength in excess of 1000 Mpa.

According to a preferred embodiment of the invention, the outer ring is made from a resin based filament wound material. The fibre reinforcement may typically be carbon fibre, having a tensile strength of the order of 2000 Mpa.

In order to provide the necessary high pre-compression to the inner ring, the outer ring should apply compression to the inner ring of 0.1 to 1% of the diameter of the inner ring. Because of the low thermal coefficient of expansion of the two rings, the conventional heat shrink fitting techniques are not suitable for producing the composite rings of the present invention.

In accordance with a further aspect of the present invention, a method of forming a composite seal face ring comprises mounting the inner and outer rings coaxially of one another in end to end relationship, applying fluid under pressure to the external diameter of the inner ring and/or an internal diameter of the outer ring, in order to compress the inner ring and/or expand the outer ring, to a degree sufficient to provide a clearance between the external diameter of the inner ring and the internal diameter of the outer ring, sliding the outer ring over the inner ring and releasing the pressure in order to allow the inner ring to expand into engagement with the internal diameter of the outer ring and/or the outer ring to contract into engagement with the external diameter of the inner ring.

Alternatively or in addition, fluid under pressure may be applied to the internal diameter of the outer ring to expand the outer ring.

According to a further aspect of the present invention an apparatus for forming composite seal face rings comprises first and second platens slidably mounted within a bore defined by an outer housing, the platens being adapted to clamp the inner seal ring with a clearance on its internal diameter and, with the outer housing, to define a sealed chamber, means being provided for location of the outer ring in the sealed chamber, coaxially of and in end to end relationship with the inner ring, means being provided for introduction of fluid under pressure into the sealed chamber to compress the inner ring and/or expand the outer ring and means being provided for moving the outer ring axially relative to the inner ring, when the inner ring has been compressed and/or outer ring has been expanded by fluid in the sealed chamber.

BRIEF DESCRIPTION OF THE DRAWINGS

An embodiment of the invention is now described, by way of example only, with reference to the accompanying drawings, in which.

DETAILED DESCRIPTION OF THE INVENTION

Figure 1:
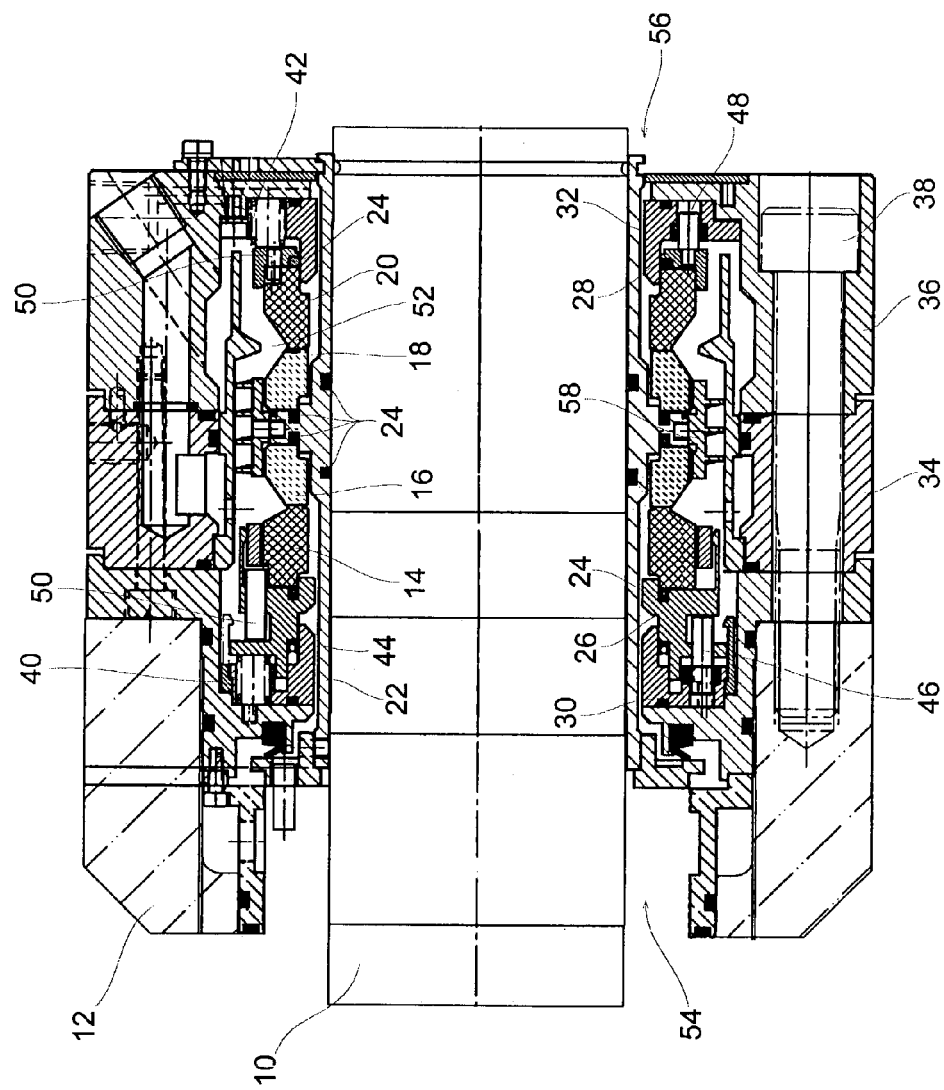
FIG. 1 is a partial cross-sectional side elevation of a seal in accordance with the present invention.

As illustrated in FIG. 1, a seal between a shaft 10 and a housing 12 comprises two pairs of sealing rings 14,16 and 18,20 mounted in spaced relationship coaxially of the shaft 10, sealing rings 14,16 being mounted inboard of sealing rings 18,20.

The sealing rings 16 and 18 are mounted back-to-back on a sleeve 22. The sleeve 22 is mounted on shaft 10 in fixed axial and rotational relationship thereto and the sealing rings 16,18 are mounted on the sleeve 22 in fixed axial and rotational relationship thereto, so that the sealing rings 16,18 will rotate with the shaft 10. The sealing rings 16,18 are sealed with respect to the sleeve 22 and the sleeve 22 is sealed with respect to the shaft 10, by elastomeric O-rings 24.

Sealing rings 14 and 20 are mounted on carriers 26 and 28 respectively, which are slidably located in annular bushes 30,32. The bushes 30,32 are secured to the housing 12, by seal plates 34,36 and bolts 38. Sealing rings 14,20 are biased axially towards one another and into sealing engagement with the sealing rings 16,18 respectively, by means of angularly spaced helical compression springs 40,42. The sealing rings 14,20 are sealed with respect to the carriers 26,28 and the bushes 30,32 are sealed with respect to the housing 12, by means of elastomeric O-rings 24. Carrier rings 26 and 28 are sealed with respect to the bushes 30,32 by means of spring energised polymer seals 44.

Pins 46 and 48 are mounted on carriers 26 and 28 and slidingly engage in the bushes 30,32 to prevent rotation of the carriers 26,28. Similarly, pins 50 are provided between the carriers 26 and 28 and sealing rings 14,20 respectively, to prevent rotation of the sealing rings 14,20.

The sealing rings 14,16; 18,20 thereby define a sealed barrier chamber 52 between the product side 54 of the seal and side 56 which is open to atmosphere. A barrier fluid under pressure is circulated through chamber 52 through an inlet and outlet (not shown) in the housing 12. A pump ring 58 is mounted on sleeve 22 between rings 16 and 18, for rotation with the shaft, in order to circulate the barrier fluid through the chamber 52.

The sealing rings 16,18 are typically formed from silicon carbide, while sealing rings 14,20 are made from a carbon/graphite or a silicon carbide/graphite composite material with good tribological properties.

Figure 2:
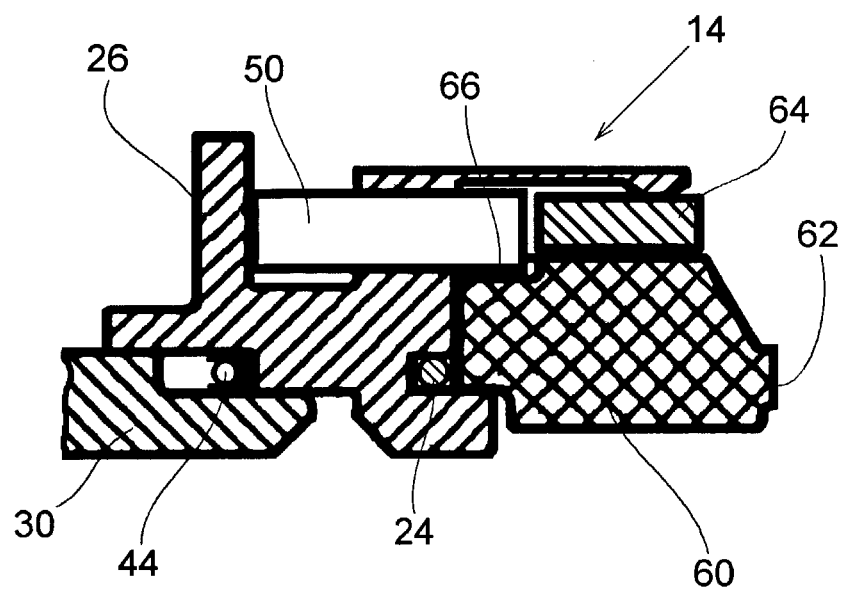
FIG. 2 shows an enlarged sectional view of a sealing ring used in the seal shown in FIG. 1.

As shown in greater detail in FIG. 2, sealing ring 14 of the inboard pair of sealing rings 14,16 comprises an inner ring 60 made of carbon/graphite or silicon carbide/graphite composite material and defining the sealing face 62. An outer ring 64 formed of material of high tensile strength is mounted about the external diameter of the inner ring 60, to pre-compress the inner ring 60. Both rings 60 and 64 are formed of materials having a coefficient thermal expansion of less than $10 \times 10^{-6}/° K$. The outer ring is typically formed from resin-based filament wound material. Carbon fibre filaments having a tensile strength of the order of 2000 Mpa may be used. However, other fibres of appropriate strength could alternatively be used.

The inner ring 60 has a taper at its outer diameter, at the end remote from the seal face 62. A part-circular axially extending groove formation 66 is also provided in this end of the ring 60 on its outer diameter, for engagement of the pin 50.

The outer ring 64 is sized such that when it is mounted about the inner ring 60, it pre-compresses the inner ring 60 to provide a reduction in the external diameter of the inner ring 60 of from 0.1 to 1%.

Figure 3:
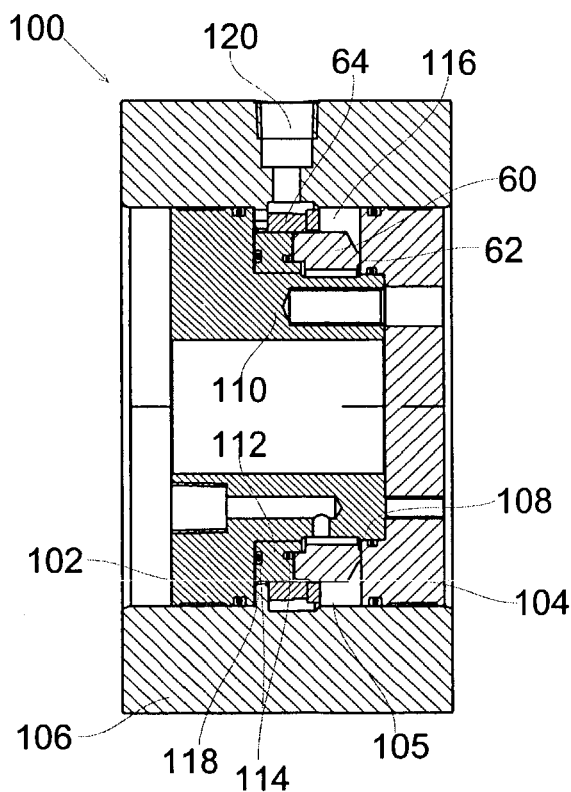
FIG. 3 shows a cross-section of a rig for forming a seal face ring in accordance with the present invention.

In order to assemble the composite seal ring 16, the inner and outer rings 60 and 64 are mounted in a jig 100, as illustrated in FIG. 3. The jig 100 comprises a pair of platens 102 and 104 slidingly located in a bore 105 defined by an outer housing 106, the platens 102, 104 being sealed with respect to the bore 105. Platen 102 is stepped and platen 104 has a recessed portion 108 which slidingly engages the smaller diameter portion 110 of platen 102.

The inner sealing ring 60 is located in the jig 100 about the smaller diameter portion 110 of platen 102 and is located coaxially thereof on a carrier ring 112. The carrier ring 112 is sealed to the platen 102 and the inner sealing ring 60 by elastomeric O-rings 114. The platens 102 and 104 are then brought towards one another so that sealing face 62 of the inner ring 60 sealingly engages platen 104 to form a fluid-tight chamber 116 on the external diameter of inner ring 60.

The outer ring 64 is located coaxially of the inner ring 60 and is slidingly supported on an external diameter of carrier ring 112. An internal flange formation 118 of the housing 106 engages a radial face of the outer ring 64, which is remote from the inner ring 60.

An inlet 120 is provided in the outer housing 106, by which hydraulic fluid may be introduced into the chamber 116 to apply a compressive load to the inner ring 60. When the inner ring 60 has been compressed to a sufficient degree the outer housing 106 may be moved axially relative to the platens 102 and 104, in order to slide the outer ring 64 over the inner ring 60. The pressure of hydraulic fluid in chamber 116 may then be reduced, allowing the inner ring 60 to expand against the outer ring 64.

In this manner the inner ring 60 may be pre-compressed to a degree sufficient to withstand internal pressurisation of the sealing ring 14 by the product pressure, should the barrier fluid pressure fail.

In a modified process, the outer housing 106 of jig 100 is formed in two parts 106a and 106b. The parts 106a and 106b are clamped together and define an internal annular recess 130, the diameter of the circumferential surface of which is greater than the external diameter of the outer ring 64. The outer ring 64 is located in the recess 130 and is sealed with respect thereto by O-ring seals 132.

An inlet 134 for hydraulic fluid is provided in platen 102, the inlet opening to the internal diameter of the inner ring 60. A passageway 136 is provided through carrier ring 112, from the internal diameter to the external diameter of inner ring 60.

In place of the passageway 136 through carrier ring 112, radial grooves may be provided in the face of platen 104 which is engaged by the sealing face 62 of the inner ring 60, in order to allow passage of fluid from the internal diameter to the external diameter of ring 60.

When hydraulic fluid under is applied through inlet 134, the pressure will act on both the internal and external diameters of the inner ring 60. The outer ring 64 will however be exposed to pressure on its internal diameter only. The hydraulic fluid will consequently expand the outer ring 64. When the outer ring 64 is sufficiently expanded, the platens 102, 104 may be moved relative to the outer housing 106a, 106b to slide the outer ring 64 over the inner ring 60. Release of hydraulic pressure will then allow the outer ring 64 to contract, pre-compressing the inner ring 60.

Figure 4:
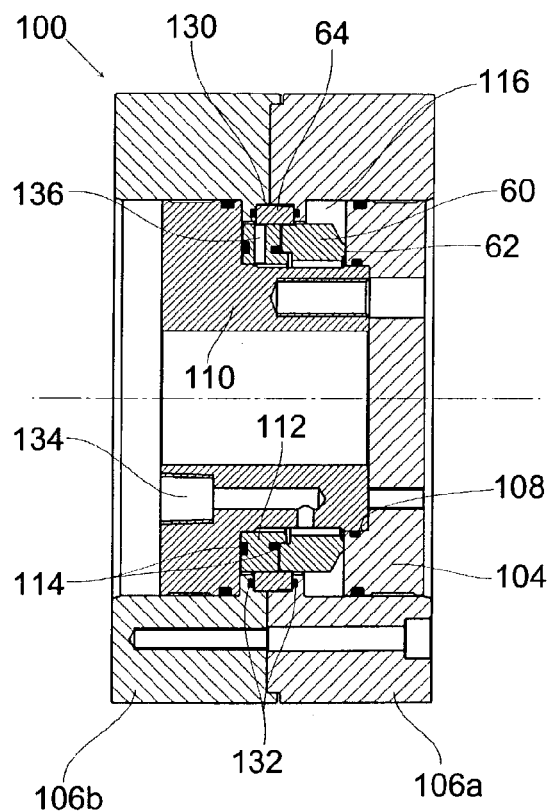
FIG. 4 shows a cross-section of a modification to the rig shown in FIG. 3.
Figure 5:
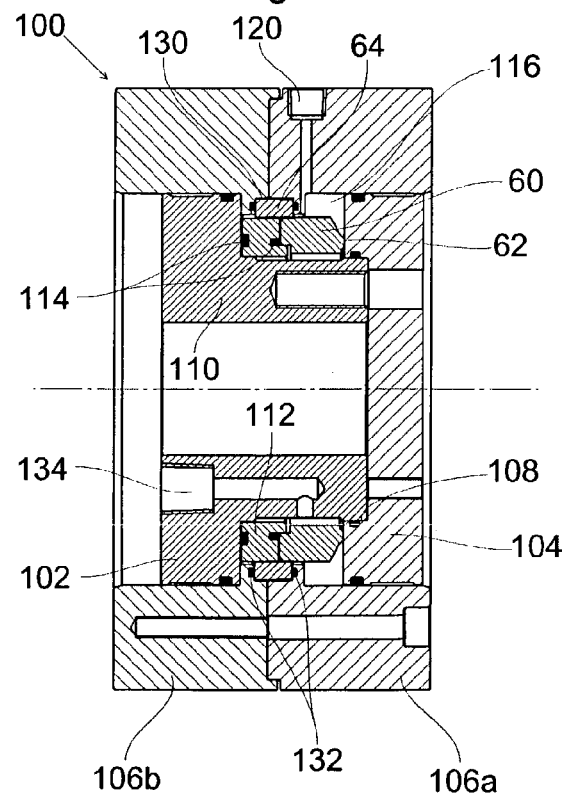
FIG. 5 shows a cross-section of a modification to the rig shown in FIG. 4.

In the ring 100 illustrated in FIG. 5, the outer ring 64 is located in an annular groove 130 in the outer housing 106a, 106b in similar manner the process described with reference to FIG. 4. However in this embodiment, the inner ring 60 and carrier 112 are sealed with respect to platens 102 and 104 and hydraulic fluid under pressure is applied only chamber 116, on the external diameter of the inner ring 60. In this manner the hydraulic pressure acts on the external diameter of the inner ring 60 compressing ring 60 as in the embodiment shown in FIG. 3 and at the same time acts in the internal diameter of the outer ring 64, expanding ring 64 in the manner described with reference to FIG. 4.

What is claimed is:

1. A method of forming a composite seal face ring comprising mounting the inner and outer rings coaxially of one another in end to end relationship, applying fluid under pressure to the external diameter of the inner ring and/or an internal diameter of the outer ring, in order to compress the inner ring and/or expand the outer ring, to a degree sufficient to provide a clearance between the external diameter of the inner ring and the internal diameter of the outer ring, sliding the outer ring over the inner ring and releasing the pressure in order to allow the inner ring to expand into engagement with the internal diameter of the outer ring and/or the outer ring to contract into engagement with the external diameter of the inner ring.

2. The method according to claim 1, further comprising the step of compressing the inner ring, via the external ring, to an extent sufficient to reduce the external diameter of the inner ring by 0.1 to 1%.

* * * * *